(12) United States Patent
Ferrier et al.

(10) Patent No.: US 12,103,694 B2
(45) Date of Patent: Oct. 1, 2024

(54) NACELLE AIR INTAKE AND NACELLE COMPRISING SUCH AN AIR INTAKE

(71) Applicant: Safran Nacelles, Gonfreville l'Orcher (FR)

(72) Inventors: Gina Ferrier, Moissy Cramayel (FR); Patrick Boileau, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 262 days.

(21) Appl. No.: 17/510,626

(22) Filed: Oct. 26, 2021

(65) Prior Publication Data
US 2022/0041295 A1 Feb. 10, 2022

Related U.S. Application Data

(63) Continuation of application No. PCT/FR2020/050695, filed on Apr. 23, 2020.

(30) Foreign Application Priority Data

Apr. 26, 2019 (FR) ...................................... 19/04429

(51) Int. Cl.
*B64D 33/02* (2006.01)
*B64D 29/06* (2006.01)
*F02C 7/04* (2006.01)

(52) U.S. Cl.
CPC ............. *B64D 33/02* (2013.01); *B64D 29/06* (2013.01); *F02C 7/04* (2013.01);
(Continued)

(58) Field of Classification Search
CPC .............................. B64D 33/02; B64D 29/06; B64D 2033/0206; B64D 2033/0273; B64D 2033/0286; F02C 7/04; F05D 2230/60
See application file for complete search history.

(56) References Cited

U.S. PATENT DOCUMENTS

| | | | |
|---|---|---|---|
| 2002/0179773 A1* | 12/2002 | Breer | ..................... B64D 15/04 244/134 R |
| 2008/0016844 A1* | 1/2008 | Shutrump | ................. F02K 3/02 60/226.1 |

(Continued)

FOREIGN PATENT DOCUMENTS

| | | |
|---|---|---|
| EP | 0913326 | 5/1999 |
| FR | 2856379 | 12/2004 |

(Continued)

OTHER PUBLICATIONS

International Search Report for International Application PCT/FR2020/050695, mailed Sep. 11, 2020.

*Primary Examiner* — Justin M Benedik
(74) *Attorney, Agent, or Firm* — Burris Law, PLLC

(57) ABSTRACT

An air intake for a nacelle of an aircraft engine includes a substantially cylindrical outer wall, a substantially cylindrical inner wall, a front lip, a front mounting flange, and a support structure. The front lip connects the substantially cylindrical inner wall and the substantially cylindrical outer wall. The front mounting flange is configured to cooperate with a rear flange of a wall of the aircraft engine forming a fan casing. The support structure comprises a lower end configured to be secured to the fan casing, by the rear flange, and an upper end in contact at least with a downstream portion of the outer wall. The support structure includes access apertures configured to be crossed by maintenance tools during operations of maintenance of the air intake.

13 Claims, 6 Drawing Sheets

(52) U.S. Cl.
CPC ............... *B64D 2033/0206* (2013.01); *B64D 2033/0273* (2013.01); *B64D 2033/0286* (2013.01); *F05D 2230/60* (2013.01)

(56) References Cited

U.S. PATENT DOCUMENTS

| | | | |
|---|---|---|---|
| 2008/0078612 A1* | 4/2008 | Strunk | B64D 33/02 |
| | | | 181/214 |
| 2019/0093557 A1* | 3/2019 | Thomas | B64D 33/02 |

FOREIGN PATENT DOCUMENTS

| | | | | |
|---|---|---|---|---|
| FR | 2966126 | | 4/2012 | |
| FR | 2966126 A1 * | | 4/2012 | ............ B64D 33/02 |
| FR | 2998548 | | 5/2014 | |
| FR | 3016159 | | 7/2015 | |

\* cited by examiner

NACELLE AIR INTAKE AND NACELLE COMPRISING SUCH AN AIR INTAKE

CROSS-REFERENCE TO RELATED APPLICATIONS

This application is a continuation of International Application No. PCT/FR2020/050695, filed on Apr. 23, 2020, which claims priority to and the benefit of FR 19/04429 filed on Apr. 26, 2019. The disclosures of the above applications are incorporated herein by reference.

FIELD

The present disclosure relates to an aircraft propulsion unit comprising a nacelle and an engine such as a turbojet engine, and concerns in particular an air intake of such a nacelle.

BACKGROUND

The statements in this section merely provide background information related to the present disclosure and may not constitute prior art.

An aircraft is propelled by one or several turbojet engine(s) each housed within at least one nacelle. In general, the nacelle has a tubular structure comprising an air intake section upstream of the turbojet engine, a middle section configured to surround a fan of the turbojet engine, and a downstream section accommodating the thrust reversal means.

The downstream section of the nacelle surrounds the gas generator of the turbojet engine which terminates in an ejection nozzle located downstream of the turbojet engine.

In particular, the air intake section of the nacelle includes a front lip with an annular general shape which intercepts the intake air stream of the nacelle which is directed towards a fan.

For this purpose, the rest of the air intake structure has a substantially annular structure comprising an outer panel or wall providing the outer aerodynamic continuity of the nacelle and an inner panel or wall providing the inner aerodynamic continuity of the nacelle, in particular with the fan casing at the level of the middle section. The air intake lip provides the junction between these two walls forming a leading edge of the nacelle and could in particular be integrated to the outer and/or inner panel thereby forming a main wall of the air intake.

In general, the front lip is constituted by one single annular-shaped part which is directly fastened on support partitions internal to the nacelle. Also, it should be noted the use of an upstream partition which forms an annular volume behind the "D"-like shaped front lip.

More specifically, the nacelle intake section generally includes: an inner wall, preferably provided with a substantially cylindrical inner acoustic part having an upstream edge and a downstream edge, this part forming at least one portion of an acoustic shroud of the air intake being called "inner barrel;" a substantially cylindrical outer wall; a front lip connecting the inner and outer walls forming a leading edge; a downstream mounting flange configured for mounting of the intake section to a front flange of a wall of the turbojet engine; and a rear partition having a downstream end to secure the outer portion of the outer wall to the downstream mounting flange.

Moreover, the air intake generally comprises a deicing system. A known type of deicing or anti-icing system, disclosed in particular by the documents EP 0 913 326 B1 or U.S. Publication No. 2002/0179773 A1, includes a circular tube surrounding the nacelle, which feeds in hot air sampled on the turbojet engine, the internal volume of the front lip of this nacelle in order to heat up its walls.

The extension of the front lip of the nacelle is desired in particular for aerodynamic reasons, in order to extend the laminar air flow area downstream. But its extension is not without impact on the design of the rest of the nacelle. In particular, the nacelle should have mechanical rigidity performances so as to reduce its deformations when subjected to the operating loads.

This results in the part that forms the front lip which limits the fresh air intake of the nacelle has a complex shape and large dimensions when viewed in section.

To address these issues, the concept of a so-called "extended" lip has been developed comprising an outer wall extending far downstream with respect to the inner wall and externally covering a portion of the fan casing. The outer wall as well as the lip forming an integral part, that is to say made in one-piece.

Such an arrangement described in the state of the art allows for savings in the material mass and in the complexity of the parts in comparison with the older state of the art wherein the outer envelope and the front lip of the intake section of the nacelle are constituted by separate parts.

However, for these arrangements to be advantageous, additional annular reinforcements are used and disposed inside the outer envelope. Moreover, the unique part formed in this manner has a large dimension and a considerable volume and thus generally requires a complex and expensive tool.

Yet, the solution of a lip integral with the outer wall of the intake section of the nacelle also encounters issues of adaptation to other requirements.

Among these, mention may be made in particular of the maintenance issue. Indeed, in order to inspect the different systems such as the de-icing or to inspect the condition of the structure, access to the space comprised between the front (or upstream) and rear (or downstream) partitions, which is then inaccessible if the part forming the lip and the outer wall are made in one-piece, should be provided for.

SUMMARY

This section provides a general summary of the disclosure and is not a comprehensive disclosure of its full scope or all of its features.

The present disclosure provides a solution having the advantages in terms of aerodynamism of a so-called extended lip while providing an improved maintenance.

The present disclosure provides an air intake for a nacelle of an aircraft engine. The air intake comprises a front lip connecting a substantially cylindrical inner wall and a substantially cylindrical outer wall, and a front mounting flange configured to cooperate with a rear flange of a wall of the turbojet engine. The air intake further comprises a support structure extending from a lower end configured to be secured to a fan casing, at the level of the rear flange, up to an upper end in contact at least with a downstream portion of the outer wall of the air intake. The support structure comprises access apertures configured to be crossed by maintenance tools during the operations of maintenance of the air intake.

Thanks to such a combination of features, the effort path is improved between the air intake and the nacelle, in particular with the rear flange of the wall of the turbojet engine of the fan casing at the level of which the support structure is configured to be secured.

Referring to the support structure, by the expression "secured," it should be understood that the support structure is configured to be secured to the wall of the turbojet engine forming the fan casing so that a force take-up path, in the assembled position, passes from the outer wall towards the fan casing, without passing through the inner wall.

According to one form, the support structure is directly fastened to the rear flange of the wall of the turbojet engine forming the fan casing.

Moreover, accessibility to the fasteners of the air intake on the fan casing is preserved thanks to the access apertures which facilitate maintenance, in particular after deposition and opening of the fan external cowls.

According to another form, the air intake lip may be integrated to the inner and/or outer wall.

According to yet another form, the air intake lip could be integrated to the inner and/or outer wall so as to form together a wall in one-piece. In other words, the air intake lip, the inner wall and the outer wall are formed in one-piece.

Advantageously, the lower end of the support structure is configured to be secured to a rear face of the rear flange. This also assists in improving the effort path and in reinforcing the structure.

According to one form, the lower end of the support structure is directly fastened to the rear face of the rear flange.

According to another form, the front mounting flange and the rear flange are fastened together by fastening means, the support structure being fastened to the rear flange with all or part of these same fastening means. Such a feature allows avoiding the multiplication of the fastening means and therefore saving weight and gaining in design simplicity. Alternatively, these fastening means may be distinct at least partially or completely.

According to yet another form, the support structure is disposed substantially continuously around the wall of the turbojet engine of the fan casing, and comprises for example a partition. Alternatively or complementarily, the support structure is disposed discontinuously around the wall of the turbojet engine of the fan casing, and comprises for example a set of support rods. In this case, a space between two rods may delimit an access aperture for maintenance.

According to one form, the portion of the outer wall which is at least in contact with the upper end of the support structure, at the level of a support surface of said support structure, comprises a downstream end of the outer wall.

According to another form, besides being in contact against a support surface of the support structure, the outer wall is bearing against it and fastened thereto by fastening means. This allows a better strength of the parts given the stresses to which the air intake is subjected.

According to yet another form, the downstream end of the outer wall is configured to support a front end of the fan external cowl, in the assembled position. The support being, in one form, completed by fastening means. In such a configuration, the junction of the downstream end of the outer wall with the support structure is located under the bearing area of the fan external cowl on the outer wall of the air intake. In this case, the downstream end of the outer wall has a cutout sized according to the radial thickness of said fan external cowl so that the two walls successively forming the external aerodynamic line of the nacelle are continuous and flush. Because the junction is located under the bearing area of the fan external cowl, this allows avoiding altering the quality of the lines and the cosmetic appearance (paint) by obvious fasteners. Therefore, the possible fastening means could have larger dimensions and be less numerous.

According to another form, the present disclosure provides a nacelle comprising an air intake including all or part of the aforementioned features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
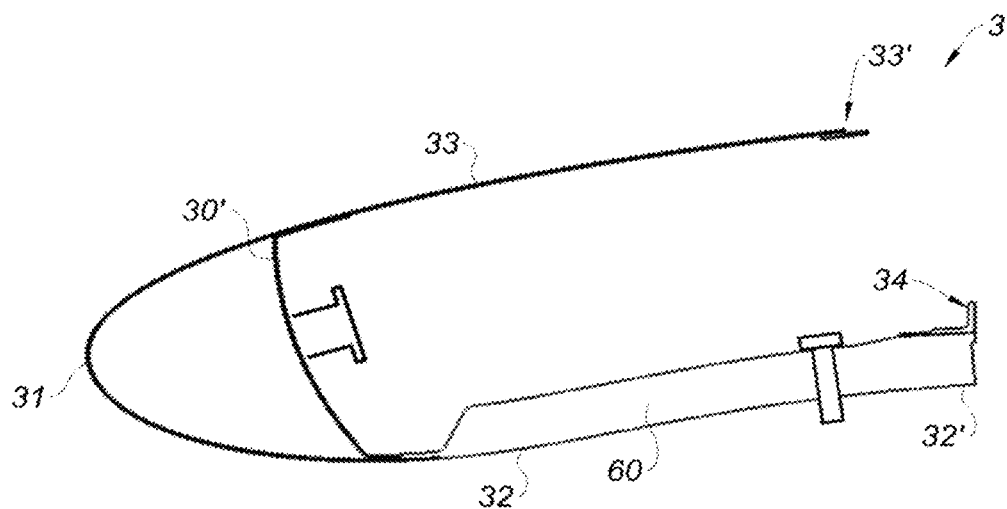
Figure 4:
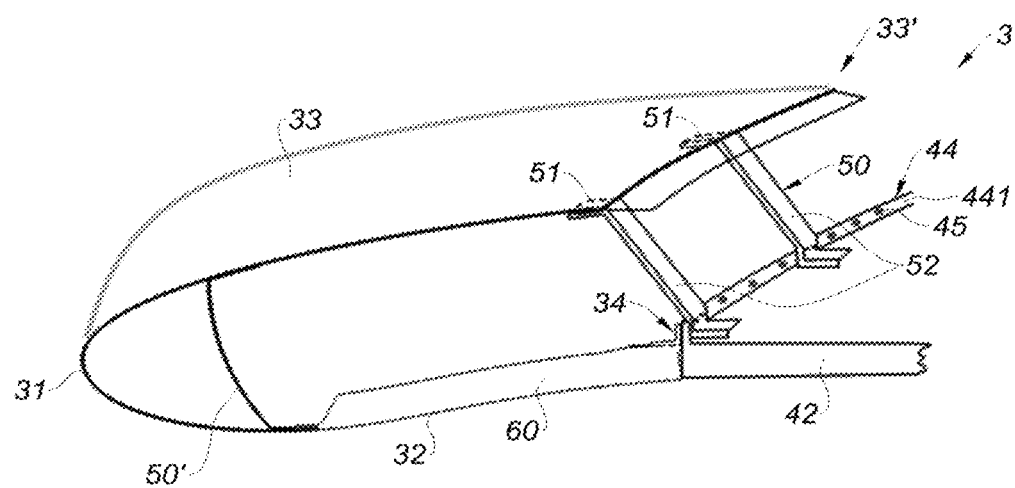
Figure 5:
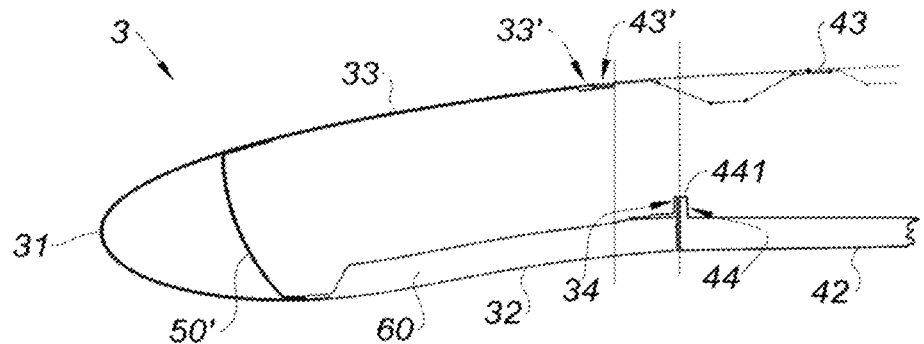
Figure 6A:
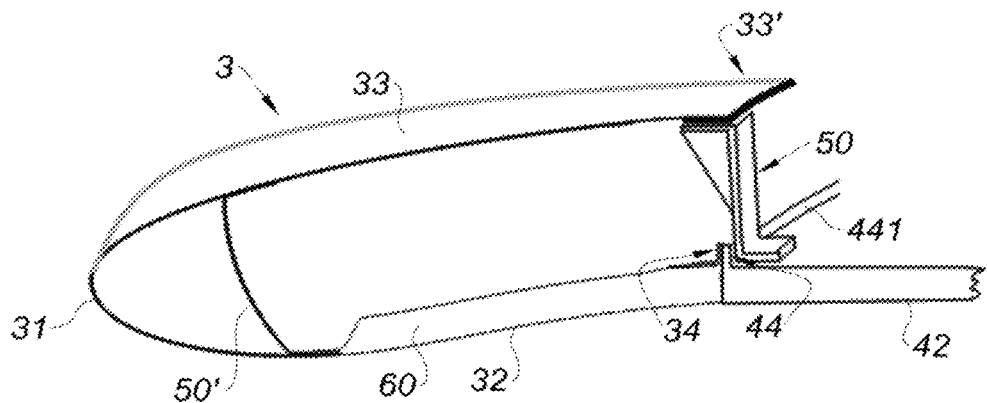
Figure 6B:
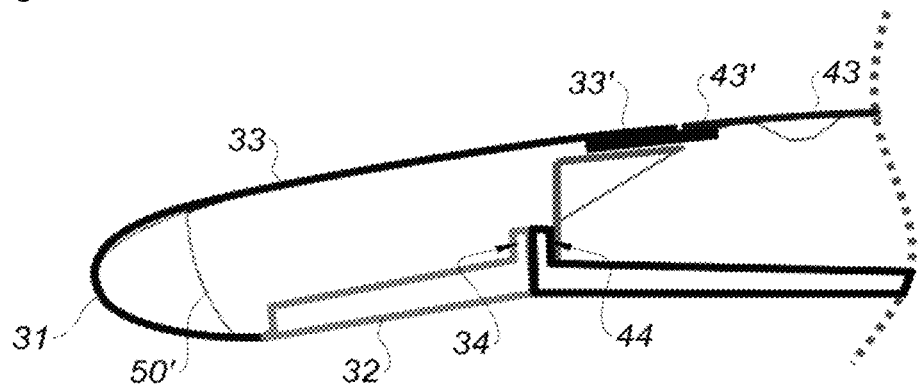
Figure 7:
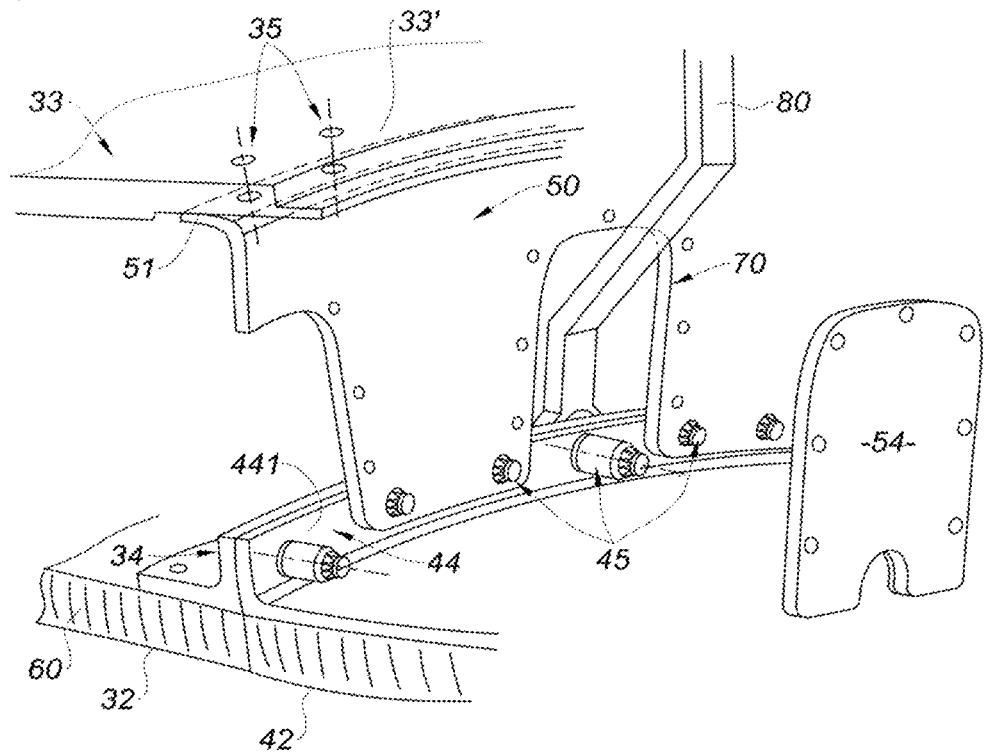
Figure 8:
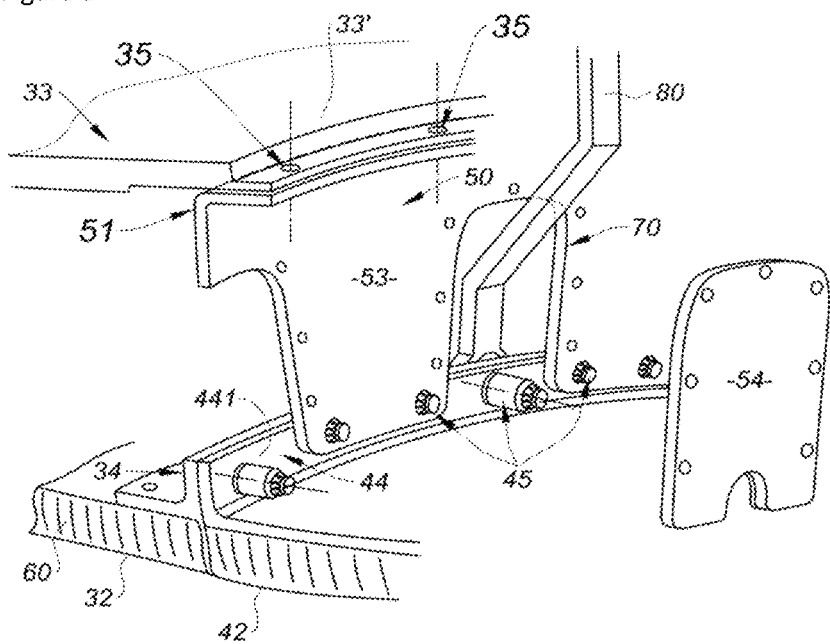
Figure 9:
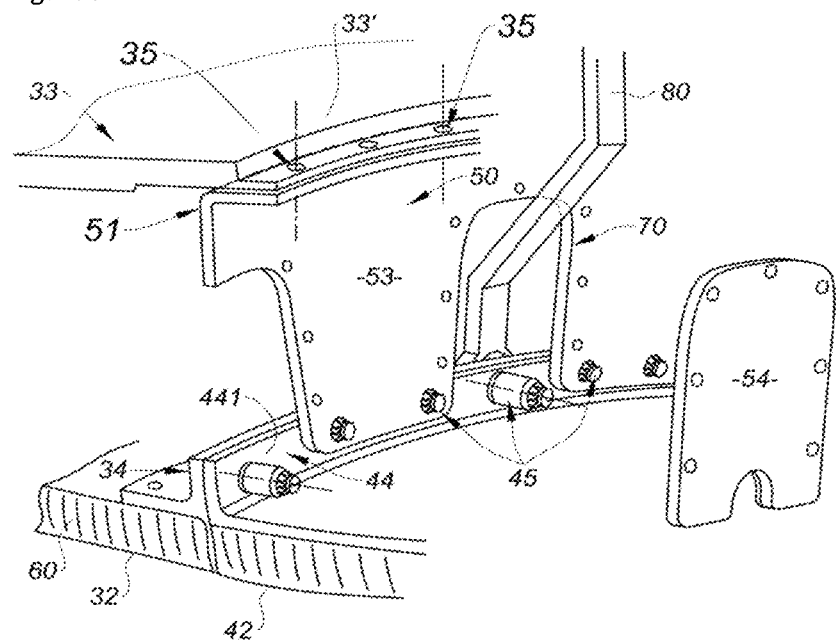
Figure 10:
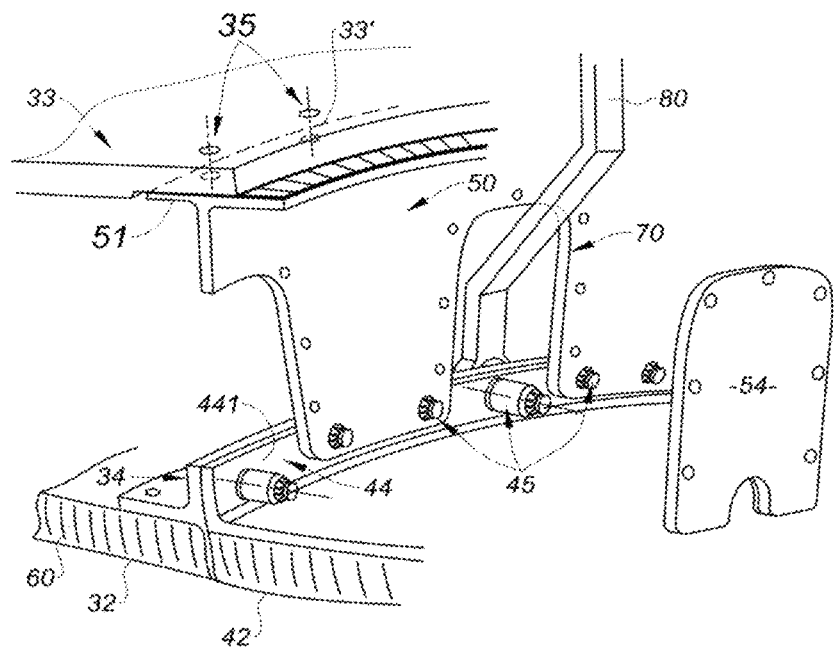
Figure 11:
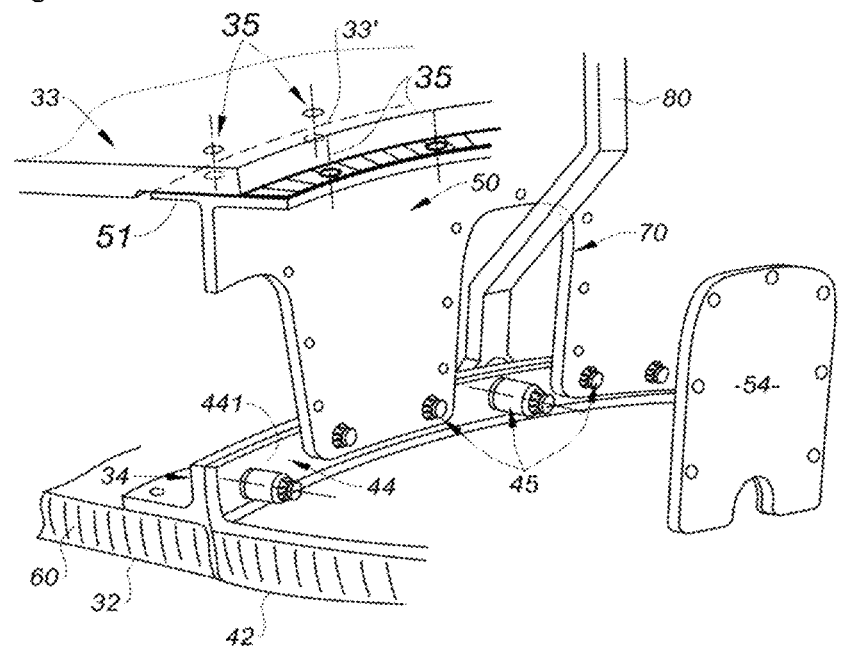

FIGS. 3, 4, and 5 are partial longitudinal sectional views of an air intake of a nacelle according to various forms;

FIGS. 6A and 6B are partial longitudinal sectional views of an air intake of a nacelle according to various forms;

FIG. 7 is a perspective view of a portion of an air intake showing an access aperture crossed by a maintenance tool during an operation of maintenance of the air intake;

FIG. 8 is a perspective view of a portion of another air intake showing a support structure fastening with an outer wall and a fan external cowl of the air intake;

FIG. 9 is a perspective view of a portion of yet another air intake showing a support structure fastening with an outer wall and a fan external cowl of the air intake;

FIG. 10 is a perspective view of a portion of yet another air intake showing a support structure fastening with an outer wall and a fan external cowl of the air intake; and FIG. 11 is a perspective view of a portion of yet another air intake showing a support structure fastening with an outer wall and a fan external cowl of the air intake.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all these figures, identical or similar references refer to identical or similar members or sets of members.

The expression "upstream" and "front" will be used indiscriminately to refer to the upstream of the air intake and the expression "downstream" and "rear" will be used indiscriminately to refer to the downstream of the air intake.

Figure 1:
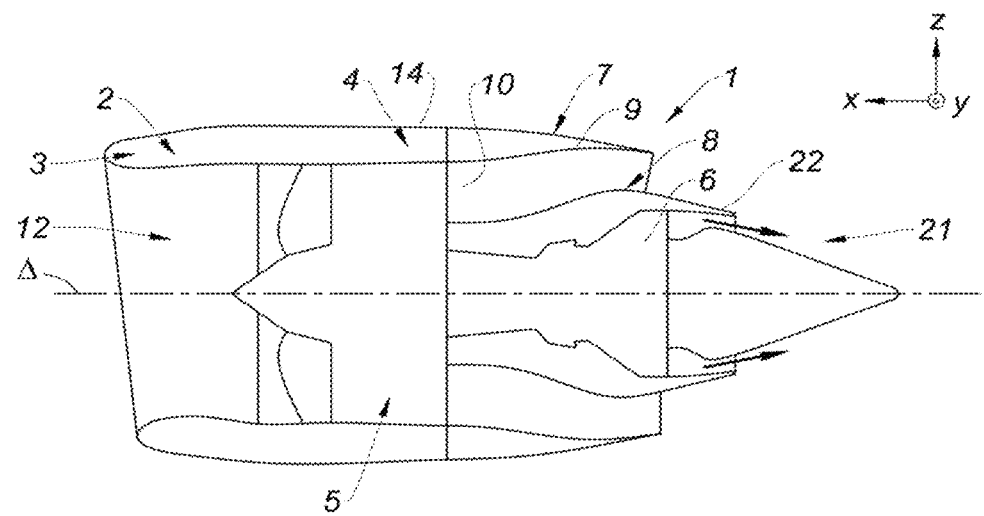
FIG. 1 is a cross-sectional view of a nacelle according to the principles of the present disclosure.

As illustrated in FIG. 1, a nacelle 1 according to the present disclosure has a substantially tubular shape according to a longitudinal axis A (direction parallel to X).

The nacelle 1 comprises an upstream section 2 with an air intake 3, a middle section 4 surrounding a fan 5 of an engine 6 such as a bypass turbojet engine and a downstream section 7 accommodating a thrust reverser system (not shown), the nacelle being configured to channel the air streams generated by the engine 6.

The air intake 3 is split into two portions, namely, on the one hand, an intake lip 31 adapted to allow the capture towards the turbojet engine of the air desired to feeding of the fan and of the inner compressors of the turbojet engine and, on the other hand, a downstream structure comprising walls 32, 33 on which the lip is attached and configured to properly channel the air towards the blades of the fan. The set is attached upstream of a casing of the fan belonging to the middle section 4 of the nacelle 1.

In turn, the downstream section 7 comprises an inner structure 8 (also called "inner fixed structure" or "IFS") surrounding the upstream portion of the turbojet engine 6, an outer structure (also called "outer fan structure" or "OFS") 9 forming the cold stream channel and fixed with respect to the engine, and a movable cowl including thrust reversal means.

The IFS 8 and the OFS 9 delimits a flow path 10 allowing the passage of an air stream 12 penetrating the nacelle 1 at the level of the air intake lip 31.

The nacelle 1 includes a top 14 configured to receive a reactor attachment mast allowing fastening said nacelle 1 to a wing of the aircraft. For this purpose, said top 14 includes means for fastening said reactor mast.

In particular, the turbojet engine nacelle hangs to the reactor mast, through a beam at the level of this top.

The nacelle 1 terminates in an ejection nozzle 21.

Figure 2:
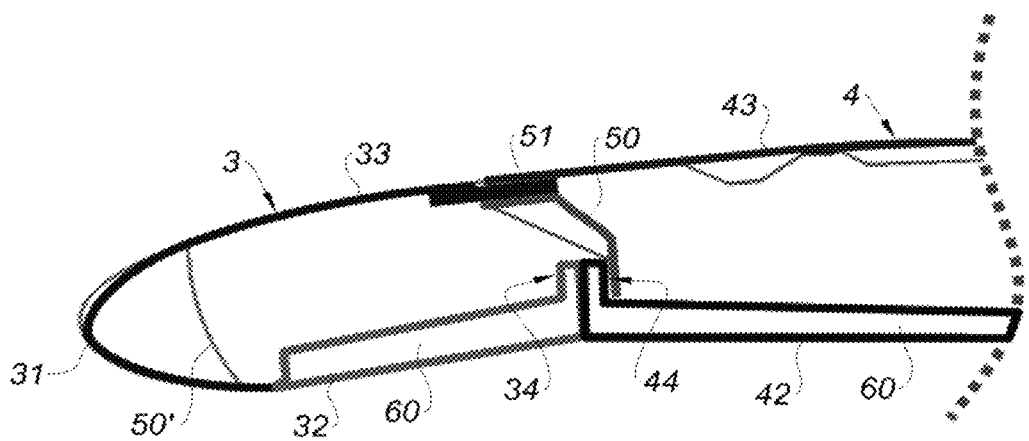
FIG. 2 is a partial longitudinal sectional view of an air intake of a nacelle.

As illustrated more specifically in FIGS. 2 to 4, the air intake 3 includes a front lip 31 forming a leading edge of the nacelle, said lip 31 connecting a substantially cylindrical inner wall 32 and a substantially cylindrical outer wall 33.

In other words, the air intake 3 has a substantially annular structure comprising the outer wall 33 providing the outer aerodynamic continuity of the nacelle 1, and the inner wall 32 providing the inner aerodynamic continuity of the nacelle 1, in particular with the fan casing at the level of the middle section 4.

The nacelle 1 comprises an external envelope and an internal envelope, said external envelope including fan cowls flush with the outer wall 33 providing the outer aerodynamic continuity and said internal envelope including a fan casing flush with the inner wall 32 providing the inner aerodynamic continuity of the nacelle 1.

The air intake lip 31 provides the junction between these two walls 32, 33 and could in particular be integrated to the inner and/or outer wall thereby forming a main wall of the air intake 3 formed in one-piece.

The internal envelope of the nacelle 1 includes an upstream portion (on the side of the air intake 3 of the nacelle 1) having in particular an acoustic shroud and a downstream portion (on the thrust reverser side) comprising the fan casing 42. Both upstream and downstream portions are connected by attachment flanges.

More specifically, the air intake 3 comprises at the level of its inner wall 32 a front mounting flange 34 configured to cooperate with a rear flange 44 secured to a wall of the turbojet engine at its upstream end, in particular of the casing 42 of the fan 5 also called engine casing and at the level of its upstream end.

This assembly of the flanges 34 and 44 provides fastening of the air intake 3 with the middle section 4. This assembly is completed and secured by fasteners or fastening means 45, for example of the screw-nut type.

The outer wall 33 has a downstream end 33' configured to be positioned in a junction area flush with a front end 43' (FIGS. 5 and 6B) of the fan external cowl 43 so as to provide the outer aerodynamic continuity of the nacelle.

To maintain some rigidity to the structure, this outer wall 33 bears against a support surface 51 (FIGS. 2 and 4) of a support structure 50. In one form, the bearing is completed with fastening means 35 to fasten the support structure 50 to said outer wall of the air intake 3. For example, these fastening means 35 may consist of fasteners such as screw-nut sets.

This support structure 50 extends substantially radially across the thickness of the nacelle 1 and is configured to be secured to the fan casing 42, and more particularly secured to the rear flange 44, on a rear face thereof, that is to say opposite to a front face configured to cooperate and/or be affixed with a rear face of the front mounting flange 34. This assists in improving the effort path.

In other words, the support structure 50 extends from a lower end configured to be secured to the middle section 4, and more particularly of the fan casing 42, at the level of the rear flange 44, up to an upper end in contact at least with a downstream portion of the outer wall 33 of the air intake 3.

The support structure 50 is fastened to the rear flange 44 with all or part of the same fastening means 45 of the front mounting flange 34 and the rear flange 44.

The support structure 50 being secured to the rear flange 44, on a rear face thereof, the fastening means 45 such as screw-nut sets crossing successively from upstream to downstream, respectively: the front mounting flange 34, the rear flange 44 and then the lower end of the support structure 50.

In accordance with the present disclosure, the support structure 50 includes access apertures 70 configured to be crossed by maintenance tools 80 during the operations of maintenance of the air intake 3.

As illustrated in FIG. 4, in this form, the support structure 50 is formed by a plurality of support rods or posts 52. The space formed between each of the support rods 52 forms an access aperture 70. In this case, the access apertures are delimited laterally by the two adjacent posts 52 on the one hand and radially by the rear flange 44 and the outer wall 33.

The support rods 52 are distributed along the entire circumference of the nacelle 1 in a relatively homogeneous manner, in particular around the rear flange 44, and are distant from each other by a predetermined distance sufficient to improve the structural integrity of the air intake of the nacelle 1.

With reference to FIGS. 3 to 5, the downstream end 33' of the outer wall 33 is located longitudinally upstream of the front mounting flange 34. By this configuration, the support structure 52 has an inclination such that its orientation deviates generally forward of the longitudinal axis of the nacelle as it gets away from the longitudinal axis.

In particular, FIGS. 3 and 5 also illustrate the air intakes 3 according to forms illustrated herein without the support structure 50 to illustrate the offset of the downstream end 33' of the outer wall 33 longitudinally upstream of the front mounting flange 34.

In FIG. 3, there is further illustrated equipment of the air intake 3 such as a power supply of a system for deicing the air intake secured to the front partition 50' and an engine probe crossing the acoustic attenuation structure 60 equipping the inner wall 32.

According to other forms, the downstream end 33' of the outer wall 33 may be located longitudinally substantially at the level of the front mounting flange 34 (FIG. 6A), or be located longitudinally substantially downstream of the front mounting flange 34 (FIG. 6B).

By "downstream of the front mounting flange," it should be understood downstream of the upstream end of the flange, that is to say downstream of a junction plane between the two flanges in the assembled position.

In order to reduce the noise pollution generated by the turbojet engine, at least the inner wall 32 of the air intake 3 is equipped with an acoustic attenuation structure 60, which is located in the space delimited by the main wall namely the inner wall 32, the outer wall 33 and the front lip 31.

This acoustic attenuation structure 60 is in the form of a panel with a cellular core forming a cellular structure whose pits delimit acoustic cells, the acoustic structure further comprising a solid inner skin providing in particular the mechanical strength of the panel.

In one form, the acoustic structure 60 is formed of composite materials. It should be understood that other materials could be used. These materials may be manufactured, for example, by thermoplastic molding, or additive manufacturing of aluminum.

The middle section also includes such an acoustic structure equipping in particular at least partially the fan casing 42.

The mounting and rear flanges 34, 44 are secured to these respective acoustic structures 60.

FIG. 7 illustrates a detail view of a support structure 50 according to one form during an operation of maintenance of the air intake 3.

In the operation of depositing or repositioning the air intake 3 off the fan casing 42, two solutions are possible depending on the configurations of the rear support of the outer wall 33.

In the case where the support of the air intake 3 by the support structure 50 is discontinuous around the wall of the turbojet engine of the fan casing (as illustrated in particular in FIG. 4), during a maintenance operation, all it needs is to detach the outer wall 33 off the support structure 50, for example by performing at first a deposition of the fan cowls (if these are fastened) or otherwise to open them (if these are movable and/or hinged), and then said outer wall 33 is detached off the support structure 50. The support structure 50 remains fastened on the fan casing during the deposition of the air intake. The support structure 50 is arranged so as to form, by its physical configuration, access apertures 70 configured to be small enough to guarantee the structural integrity of the nacelle and large enough to be crossed by maintenance tools 80 during operations of maintenance of the air intake 3. It is then easy to access both the front mounting flange 34 and the rear flange 44.

Such a support structure 50 supporting the outer wall 33 of the air intake 3 and configured discontinuously around the wall of the turbojet engine of the fan casing is generally dedicated to a fire-free environment, that is to say this nacelle type does not need to locally protect this region of the nacelle from a fire risk.

In the case of the form illustrated in FIG. 7, the support structure 50 comprises a partition which is generally continuous around the wall of the turbojet engine of the fan casing. In particular, it allows a thermal sealing compatible with a fire protection in order to provide the protection of a possible piece of equipment that would be housed within this space. In other words, in the case where the support structure 50 comprises a partition, said partition may be segmented. In one form, the partition is solid, that is to say continuous, when it provides a fire door function.

In the same manner, during a maintenance operation, all it needs is to detach the outer wall 33 off the support structure 50 and keep this support structure 50 fastened on the fan casing 42 during the deposition of the air intake 3.

The support structure 50 being continuous, it is configured so as to have access apertures 70 configured to be large enough to be crossed by maintenance tools 80 during the operations of maintenance of the air intake 3. In this form, an access aperture 70 is delimited by edges of the partition on the one hand and by the rear flange 44 on the other hand.

A closure partition of hatch 54 is also provided to close the access apertures 70 during the use of the nacelle in order to provide the continuity of the thermal protection, should this be desired.

It is then easy to access both the front mounting flange 34 and the rear flange 44, as illustrated in this FIG. 7 in order to allow dismount thereof.

In the case where the support structure 50 comprises a partition, the partition may be segmented. In one form, the partition is solid when it provides a fire door function.

Such a support structure 50 of the downstream end 33' of the outer wall 33 of the air intake directly connected to the fan casing 42, rather than to the inner wall 33, is particularly advantageous in terms of force take-up. This concept also allows for an easy access for the needs of maintenance of the flanges 34, 44 and of the equipment present in the air intake such as for example the deicing tube.

FIGS. 8, 9, 10 and 11 illustrate perspective views of a support structure 50 according to different variants of fastening with the outer wall 33 of the air intake 3 and of the fan external cowl 43.

In FIG. 8, there is shown the downstream end 33' of the outer wall 33 is configured to support the front end 43' of the fan external cowl 43 and to be fastened thereto, in the assembled position.

This outer wall 33 bears against the support surface 51 of the support structure 50. This bearing is also completed with fastening means to fasten the support structure 50 to said outer wall 33 of the air intake 3. For example, these fastening means 35 may consist of screw-nut sets.

Moreover, the downstream end 33' of the outer wall 33 has a cutout sized according to the radial thickness of said fan external cowl 43 so that the wall 33 and the cowl 43 successively form the external aerodynamic line of the nacelle are continuous and flush.

In such a configuration, the junction of the downstream end 33' of the outer wall 33 with the support structure 50 is located under the bearing area of the fan external cowl 43 on the outer wall 33 of the air intake 3. This allows avoiding altering the quality of the lines and the cosmetic appearance by obvious fasteners. Therefore, the possible fastening means could have larger dimensions and be less numerous.

In the configuration illustrated in FIG. 9, the front end 43' of the fan external cowl 43 is directly bearing and fastened together with the downstream end 33' of the outer wall 33.

According to another variant, the respective ends 33', 43' of the outer wall 33 and of the fan external cowl 43 may be adjoined and supported directly on the support surface 51 of the support structure 50 (FIGS. 10 and 11).

In this case, the fastening means 35 allow fastening the downstream end 33' of the outer wall 33 with the support structure 50 and the front end 43' of the fan external cowl 43 may be simply bearing (FIG. 10) or fastened similarly with the support structure 50 (FIG. 11).

It should be noted that the respective ends 33', 43' of the outer wall 33 and of the fan external cowl 43 may also rest on an intermediate part or are fastened thanks to this intermediate part which rests on the support surface 51 of the support structure 50.

The present disclosure is described in the foregoing as an example. It goes without saying that those skilled in the art could carry out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake for a nacelle of an aircraft engine, the air intake comprising:
    a substantially cylindrical inner wall;
    a substantially cylindrical outer wall;
    a front lip connecting the substantially cylindrical inner wall and the substantially cylindrical outer wall;
    a front mounting flange configured to cooperate with a rear flange of a wall of the aircraft engine forming a fan casing; and
    a support structure comprising a lower end configured to be secured to the fan casing, by the rear flange, and an upper end in contact at least with a downstream portion of the substantially cylindrical outer wall, the support structure including access apertures configured to be crossed by maintenance tools during operations of maintenance of the air intake,
    wherein the lower end of the support structure is positioned downstream of the front mounting flange and the rear flange.

2. The air intake according to claim 1, wherein the front lip is integrated with the substantially cylindrical inner wall and/or the substantially cylindrical outer wall so as to form a wall in one-piece.

3. The air intake according to claim 1, wherein the support structure is disposed continuously around the wall of the aircraft engine, and comprises a partition.

4. The air intake according to claim 1, wherein the support structure is disposed discontinuously around the wall of the aircraft engine, and comprises a set of support rods.

5. The air intake according to claim 1, wherein the lower end of the support structure is configured to be secured to a rear face of the rear flange.

6. The air intake according to claim 1, wherein the front mounting flange and the rear flange are fastened together by fasteners, the support structure being fastened to the rear flange via at least one of the fasteners.

7. The air intake according to claim 1, wherein a portion of the substantially cylindrical outer wall configured to come at least into contact with the upper end of the support structure, at a level of a support surface of the support structure, comprises a downstream end of the substantially cylindrical outer wall.

8. The air intake according to claim 7, wherein the substantially cylindrical outer wall is bearing against the support surface and fastened thereto by fasteners.

9. The air intake according to claim 1, wherein the downstream portion of the substantially cylindrical outer wall is configured to support a front end of a fan external cowl of the air intake, in an assembled position, by fasteners.

10. A nacelle for an aircraft engine comprising an air intake according to claim 1.

11. The air intake according to claim 1, wherein the lower end of the support structure is located above the substantially cylindrical inner wall.

12. The air intake according to claim 1, wherein the lower end of the support structure is positioned at the rear flange.

13. An air intake for a nacelle of an aircraft engine, the air intake comprising:
    a substantially cylindrical inner wall;
    a substantially cylindrical outer wall;
    a front lip connecting the substantially cylindrical inner wall and the substantially cylindrical outer wall;
    a front mounting flange configured to cooperate with a rear flange of a wall of the aircraft engine forming a fan casing; and
    a support structure comprising a lower end configured to be secured to the fan casing, by the rear flange, and an upper end in contact at least with a downstream portion of the substantially cylindrical outer wall, the support structure including access apertures configured to be crossed by maintenance tools during operations of maintenance of the air intake,
    wherein the lower end is a distal tip that is positioned above an uppermost surface of the substantially cylindrically inner wall.

* * * * *